United States Patent
Queveau et al.

(10) Patent No.: US 7,658,435 B2
(45) Date of Patent: Feb. 9, 2010

(54) DEVICE FOR TENSIONING THE RETRACTABLE TOP OF A MOTOR VEHICLE

(75) Inventors: Gérard Queveau, Le Pin (FR); Bernard Deschartes, Bressuire (FR)

(73) Assignee: Societe Europeenne de Brevets Automobiles - Seba, Paris (FR)

( * ) Notice: Subject to any disclaimer, the term of this patent is extended or adjusted under 35 U.S.C. 154(b) by 564 days.

(21) Appl. No.: 10/539,467

(22) PCT Filed: Dec. 18, 2003

(86) PCT No.: PCT/FR03/03800

§ 371 (c)(1),
(2), (4) Date: Jun. 27, 2006

(87) PCT Pub. No.: WO2004/060707

PCT Pub. Date: Jul. 22, 2004

(65) Prior Publication Data

US 2006/0249980 A1  Nov. 9, 2006

(30) Foreign Application Priority Data

Dec. 20, 2002  (FR) .................................. 02 16394

(51) Int. Cl.
*B60J 7/12* (2006.01)
(52) U.S. Cl. ................... 296/107.12; 296/120.1
(58) Field of Classification Search ............ 296/107.01, 296/107.09, 107.12, 107.16, 107.17, 120.1, 296/121, 116
See application file for complete search history.

(56) References Cited

U.S. PATENT DOCUMENTS

| 6,209,945 | B1 * | 4/2001 | Aydt et al. ............... 296/120.1 |
| 6,328,372 | B1 * | 12/2001 | Just ........................ 296/107.12 |
| 6,332,137 | B1 * | 12/2001 | Hori et al. ..................... 706/15 |
| 6,957,842 | B1 * | 10/2005 | Garska ................... 296/107.12 |
| 7,240,953 | B2 * | 7/2007 | Guillez et al. ............... 296/121 |
| 7,380,863 | B2 * | 6/2008 | Garska ................... 296/107.12 |
| 2005/0242615 | A1 * | 11/2005 | Garska ................... 296/107.12 |
| 2006/0061130 | A1 * | 3/2006 | Garska ................... 296/107.12 |
| 2007/0194596 | A1 * | 8/2007 | Heselhaus .............. 296/107.07 |

FOREIGN PATENT DOCUMENTS

FR  2 802 478 B1  3/2002

* cited by examiner

*Primary Examiner*—Glenn Dayoan
*Assistant Examiner*—Gregory Blankenship
(74) *Attorney, Agent, or Firm*—Nawrocki, Rooney & Silvertson, P.A.

(57) ABSTRACT

The invention relates to a device for tensioning the retractable top of a motor vehicle (1). Said top comprises a front element (2) and a rear element (3) which are displaceable between the closed and opened positions thereof. The displacement of said elements is controlled by two articulated arms (6, 7). The inventive device is provided with arresting means (9) carried by the first arm (7) in such a way that is abuts against the second arm (6) when two elements (2, 3) of the top are relatively near to the closed position thereof. The arresting means (9) are provided with elastic means able to resist to the relative motion of the arms (6, 7) when the elements of the top (2, 3) are displaced from the relative position thereof, which is near to the closed position, and move towards said closed position.

9 Claims, 3 Drawing Sheets

DEVICE FOR TENSIONING THE RETRACTABLE TOP OF A MOTOR VEHICLE

CROSS-REFERENCE TO RELATED APPLICATIONS

This application claims priority of PCT/FR2003/003800 filed on Dec. 18, 2003, which claims priority of French Patent Application No. 02/16394 filed on Dec. 20, 2002.

BACKGROUND OF THE INVENTION

This invention relates to a device for tensioning a retractable roof of a motor vehicle, and more particularly to such a device designed for a roof including a front element and a rear element that are mounted to be movable between a closed position in which said elements cover the passenger compartment of the vehicle and an open position in which said elements are folded away into the rear trunk of the vehicle, the elements being caused to move by two hinged arms, each of which is hinged firstly to the structure of the vehicle in the vicinity of the trunk, and secondly to the front element of the roof, so that the two arms and their respective hinges form a deformable parallelogram, said device including abutment means carried by a first arm to come into abutment against the second arm when the two roof elements are in a relative position that is close to their closed position.

Such a device is known from Document FR-A-2 802 478.

During roof closure, the abutment means cause tension between the two arms, thereby stiffening the roof and therefore reducing the vibration of the roof while the vehicle is moving. In addition, the stiffening of the roof enables said roof to participate in the rigidity of the entire body of the vehicle, as the roof does in a vehicle having a non-retractable roof.

In the above-mentioned document, the abutment means are constituted by an eccentric which is adjusted by turning about a point that is fixed relative to the arm on which it is mounted, and the eccentric is locked when it comes into contact with the other arm when the elements are in a relative position that is close to the closure position.

Such an arrangement is generally satisfactory.

However, it has the disadvantage of being difficult to adjust. Unless it is adjusted almost perfectly, a certain amount of vibration can remain.

In addition, it is not always suitable, depending on the vehicle which it is to be used in. In particular, it can be difficult to implement when the distance between the arms at the desired abutment point is large.

SUMMARY OF THE INVENTION

An object of the present invention is to mitigate those drawbacks.

More particularly, an object of the invention is to limit the vibration further while the vehicle is moving, and to facilitate adjusting the abutment means.

To this end, the invention firstly provides a device for tensioning a retractable roof of a motor vehicle, said roof including a front element and a rear element that are mounted to be movable between a closed position in which said elements cover the passenger compartment of the vehicle and an open position in which said elements are folded away into the rear trunk of the vehicle, the elements being caused to move by two hinged arms, each of which is hinged firstly to the structure of the vehicle in the vicinity of the front edge of the trunk, and secondly to the front element of the roof, so that the two arms and their respective hinges form a deformable parallelogram, said device including abutment means carried by a first arm to come into abutment against the second arm when the two roof elements are in a relative position that is close to their closed position, the abutment means including resilient means suitable for opposing the relative movement of said arms when said roof elements come from their said relative position that is close to their closed position to their said closed position.

Thus, on tensioning the roof elements during closure of the roof, a certain amount of resilience is added that is suitable for filtering out any vibration that is not already removed.

It should be noted that the front element is not necessarily the element that is connected to the windscreen of the vehicle. It is the element that is "in front" of the rear element that is generally constituted by the rear window of the vehicle. Thus, the invention applies to a roof having any number of elements.

In a particular embodiment, said abutment means comprise fastening means for fastening to said first arm, an abutment member that is mounted to slide relative to said fastening means, and adjustment means for adjusting the relative position of the fastening means and of the abutment member.

It should be noted that such an arrangement might optionally be used independently of the above-mentioned resilient means, merely for the purpose of replacing the prior art eccentric, if necessary.

More particularly, said abutment member comprises a smooth rod mounted to slide in a first opening of corresponding cross-section in the fastening means, and the adjustment means comprise a threaded rod engaged in a tapped opening in the fastening means in alignment with said first opening, said resilient means being disposed between the smooth rod and the threaded rod.

The abutment is thus adjusted merely by tightening or loosening the threaded rod in the tapped opening in the fixing means.

Also in a particular embodiment, the device of the invention includes locking means for locking the adjusted relative position of the fastening means and of the abutment member.

More particularly, said locking means may comprise a locknut engaged on said threaded rod and co-operating with the fastening means.

Also in a particular embodiment, the device of the invention includes a coupling hoop for coupling together the smooth rod and the threaded rod, each rod passing through an opening in the hoop and having a bearing shoulder for bearing against the hoop, said resilient means pressing each shoulder against a respective bearing surface of the hoop.

The device of the invention may also include second resilient means between said hoop and said fastening means, which second resilient means are arranged to push said hoop towards said tapped opening.

The invention also provides a retractable roof for a motor vehicle, said roof including a tensioning device as described above.

The invention also provides a motor vehicle including such a retractable roof.

BRIEF DESCRIPTION OF THE DRAWINGS

By way of non-limiting example, a particular embodiment of the invention is described below with reference to the accompanying drawings, in which.

DETAILED DESCRIPTION OF THE INVENTION

Figure 1:
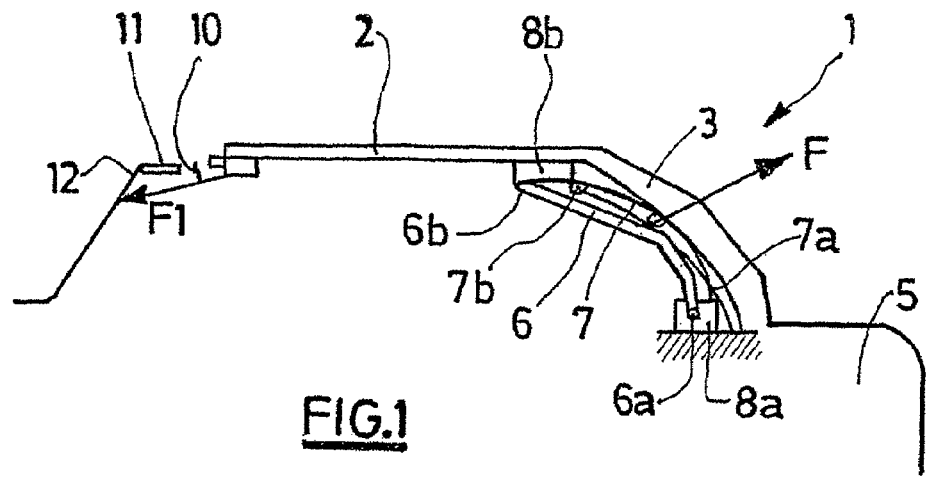
FIG. 1 is an overall elevation view of a retractable roof of the invention.

As shown in FIG. 1, the retractable roof of the vehicle 1 includes a front element 2 forming the roof and a rear element 3 forming the rear window.

The two elements 2, 3 are mounted to be movable between a closed position in which they cover the passenger compartment 4 of the vehicle 1 and an open position in which they are folded away into the rear trunk 5 of the vehicle 1.

The roof elements 2, 3 are caused to move by a front arm 6 and by a rear arm 7 that are capable of pivoting upwards from the front rearwards and vice versa.

Each of the two arms 6, 7 is hinged about an axis 6a, 7a to a support 8a secured to the body of the vehicle in the vicinity of the front edge of the trunk 5, and about an axis 6b, 7b to a support 8b secured to the element 2 of the roof. Thus, the arms 6, 7 form a deformable parallelogram.

The rear element 3 of the roof is fastened to the rear arm 7.

In the example shown, the rear arm 7 carries abutment means 9 arranged to co-operate with the front arm 6 when the elements 2, 3 are in their closed position. Naturally, the abutment means 9 could be carried by the arm 6, and could co-operate with the arm 7.

The roof elements 2, 3 are preferably moved from their open position to their closed position and vice versa by means of an actuator, such as an electric motor or a hydraulic actuator (not shown).

Finally, the retractable roof includes means such as a latch 10 and a keeper 11 for locking the front edge of the front element 2 of the roof to the top edge 12 of the windscreen of the vehicle at the end of the closure stroke, either manually or by an electric or a hydraulic system.

Figure 2:
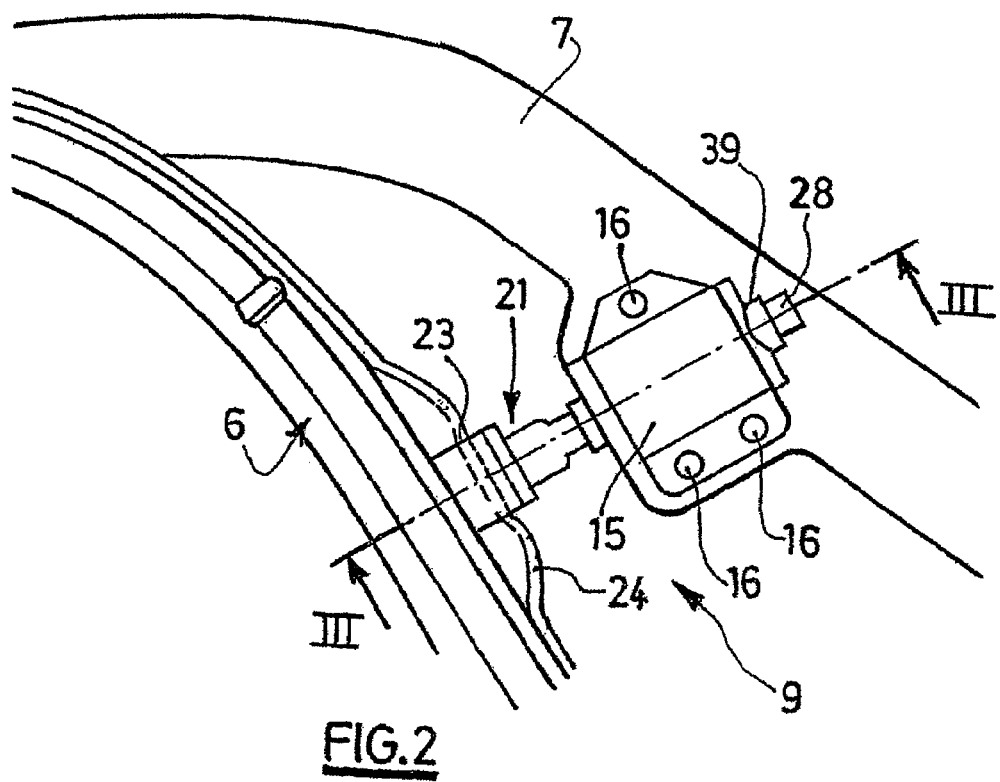
FIG. 2 is a view on a larger scale of the tensioning device of the invention.
Figure 3:
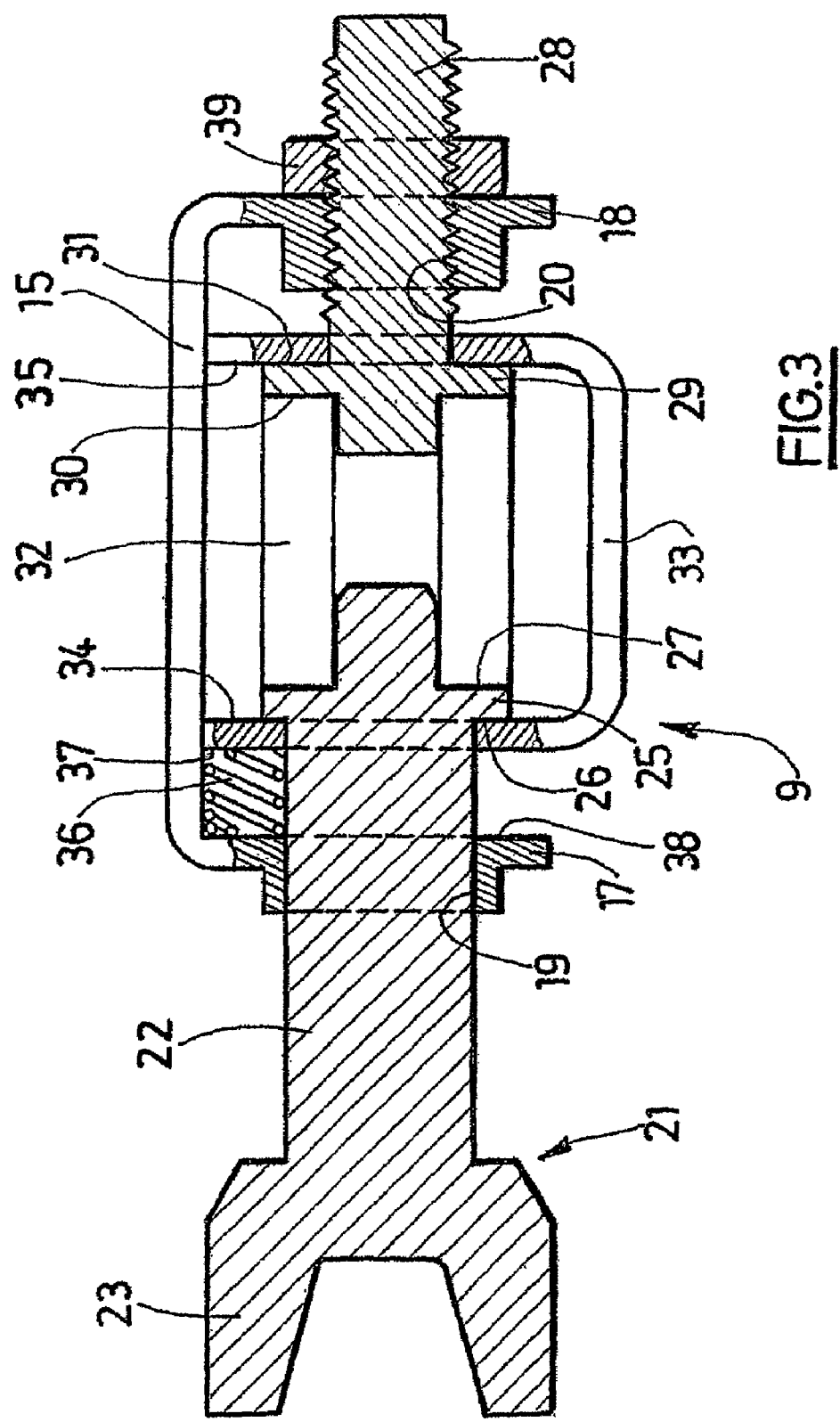
FIG. 3 is a view on an even larger scale in section along line III-III of FIG. 2.
Figure 4:
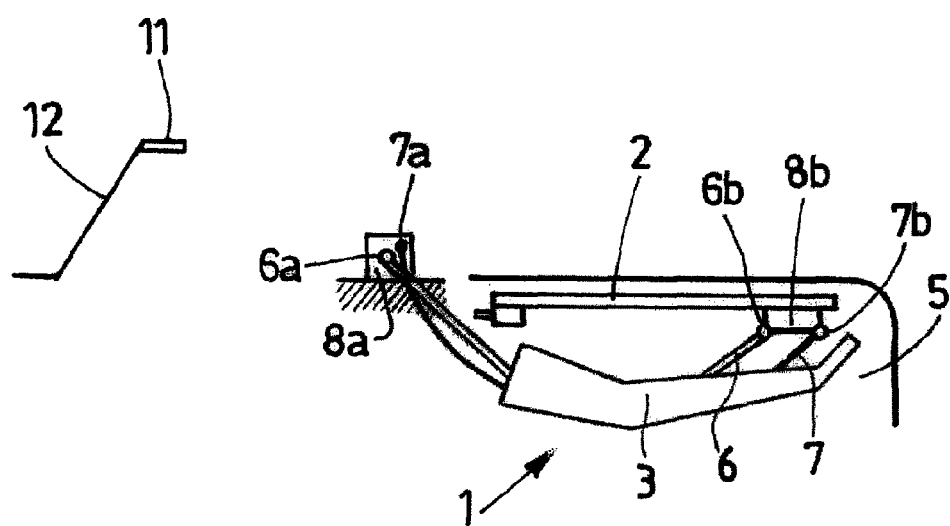
FIG. 4 is a view similar to FIG. 1 wherein the roof is in its open position in which the elements thereof are folded away into the rear trunk.

The abutment means 9 are described in greater detail with reference to FIGS. 2 and 3.

The abutment means 9 are fastened to the arm 7 via a mounting bracket 15 at three fastening points 16.

The bracket 15 is folded to form two mutually facing and parallel flanges 17 and 18.

The flange 17 is provided with an opening 19 whose inside wall is smooth, and the flange 18 is provided with an opening 20 whose inside wall is tapped. The openings 19 and 20 are in mutual alignment.

An abutment member 21 comprises a rod 22 of cross-section corresponding to the cross-section of the opening 19 and is mounted to slide in said opening. One of the ends of the abutment member 21 is thus inside the bracket 15, and the other end is outside the bracket.

Said other end forms a fork-shaped abutment 23 that is suitable for coming into abutment on a bearing ferrule 24 that is secured to the arm 6. The opposite end of the abutment member 21 forms an annular projection 25 defining two opposite shoulders, namely one shoulder 26 facing towards the abutment 23 and one shoulder 20 facing towards the opposite end.

A threaded rod 28 is screwed into the thread in the opening 20. One of the ends of the rod 28 is thus situated inside the bracket 15, and the other end is thus situated outside said bracket. By tightening the rod 28 or by loosening it, it is thus possible to adjust its longitudinal position relative to the bracket 15.

The outer end of the threaded rod 28 is provided with means via which it can be driven for tightening or loosening purposes. For example, it is of square or hexagonal cross-section. The opposite end of the rod 28 forms an annular projection 29 defining two opposite shoulders, namely one shoulder 30 facing the shoulder 27 of the abutment member 21, and one shoulder 31 facing the opposite way.

Resilient means, e.g. an elastomer ring 32 or a helical spring, are disposed between the shoulder 27 of the abutment member 21 and the shoulder 30 of the threaded rod 28. Thus, when the ring 32 is compressed, it tends to urge the abutment member 21 away from the threaded rod 28.

A coupling hoop 33 has two facing bearing faces 34 and 35. Said hoop is provided with cutouts engaged over the rod 22 and over the rod 28, and the distance between the faces 34 and 35 is such that the ring 32 is axially compressed, thereby pressing the shoulder 26 of the abutment member 21 and the shoulder 31 of the threaded rod 28 against respective ones of the bearing faces 34 and 35.

A spring 36 is disposed between that face 37 of the coupling hoop 33 which faces in the direction opposite to the direction in which the bearing face 34 faces, and the facing face 38 of the flange 17. Therefore, the spring holds the hoop 33 in contact with the shoulder 26 of the abutment member 21 when the ring 32 is compressed axially.

Finally, a locknut 39 is screwed onto the threaded rod 28 outside the bracket 15 in order to lock the rod once its position has been adjusted.

The above-described device is adjusted as follows.

Firstly, the roof is brought into a predetermined position close to its closure position.

In this position, the abutment 23 is brought into contact with the bearing ferrule 24 by turning the threaded rod 28. During this adjustment, the assembly constituted by the threaded rod 28, by the resilient ring 32, and by the abutment member 21 moves leftwards in FIG. 2, with the hoop 33 being constrained to move with them. The respective stiffnesses of the ring 32 and of the spring 36 are such that the ring 32 is substantially not compressed, only the spring 36 being compressed.

When the abutment 23 is in contact with the bearing ferrule 24, the locknut 39 is tightened on the threaded rod 28 into contact with the flange 18 of the fastening bracket 15. The threaded rod is thus locked, and the device is adjusted.

During subsequent closures of the roof, the abutment 23 comes firstly into contact with the bearing ferrule 24, and then, with the closure movement continuing, the resilient ring 32 is compressed axially. During this compression, the spring 36 holds the bearing face 34 of the hoop 33 in contact with the shoulder 26 of the abutment member 21.

When the roof is completely closed, the locking means 10, 11 are engaged, thereby exerting traction F1 on the roof. In reaction, said traction F1 generates tension F between the arms 6 and 7 at the abutment means 9.

The tension F stiffens the roof and reduces vibration which is, in addition, absorbed by the resilient means 32.

The invention claimed is:

1. A retractable roof of a motor vehicle, said roof including a front element and a rear element that are mounted to be movable between a closed position in which said elements cover the passenger compartment of the vehicle and an open position in which said elements are folded away into the rear trunk of the vehicle, the elements being caused to move by two hinged arms, each of which is hinged firstly to the structure of the vehicle in the vicinity of the front edge of the trunk, and secondly to the front element of the roof, so that the two arms and their respective hinges form a deformable parallelogram, said device further including abutment means carried by the first arm to come into abutment against the second arm when the two roof elements are in a relative position that is close to their closed position, said device being characterized by the fact that the abutment means include resilient means suitable for opposing the relative movement of said arms when said roof elements come from their said relative position that is close to their closed position to their said closed position.

2. A roof according to claim 1, in which said abutment means comprise fastening means for fastening to said first arm, an abutment member that is mounted to slide relative to said fastening means, and adjustment means for adjusting the relative position of the fastening means and of the abutment member.

3. A roof according to claim 2, in which said abutment member comprises a smooth rod mounted to slide in a first opening of corresponding cross-section in the fastening means, and the adjustment means comprise a threaded rod engaged in a tapped opening in the fastening means in alignment with said first opening, said resilient means being disposed between the smooth rod and the threaded rod.

4. A roof according to claim 2, including locking means for locking the adjusted relative position of the fastening means and of the abutment member.

5. A roof according to claim 3, in which said locking means 11 comprise a locknut engaged on said threaded rod and cooperating with the fastening means.

6. A roof according to claim 3, including a coupling hoop for coupling together the smooth rod and the threaded rod, and in which each rod passes through an opening in the hoop and has a bearing shoulder for bearing against the hoop, said resilient means pressing each shoulder against a respective bearing surface of the hoop.

7. A roof according to claim 6, including second resilient means between said hoop and said fastening means, which second resilient means are arranged to push said hoop towards said tapped opening.

8. A retractable roof for a motor vehicle, said roof being characterized by the fact that it includes a device according to claim 1.

9. A motor vehicle, characterized by the fact that it includes a retractable roof according to claim 8.

* * * * *